United States Patent Office 3,357,883
Patented Dec. 12, 1967

3,357,883
FUNGICIDAL N-SUBSTITUTED DERIVATIVES OF HALOGENATED SALICYLIDENEIMINES
Daniel Pillon, Lyon, Henri Pacheco, Bron, and Lucien Cronenberger, Lyon, France, assignors to Pechiney-Progil, Societe pour le Developpement et la Vente de Specialites Chimiques, Paris, France
No Drawing. Filed Feb. 15, 1965, Ser. No. 432,823
Claims priority, application France, Feb. 18, 1964, 964,168
8 Claims. (Cl. 167—31)

ABSTRACT OF THE DISCLOSURE

The invention is addressed to the treatment of fungus and a composition employed in same in which the essential ingredient is a compound having the following structural formula:

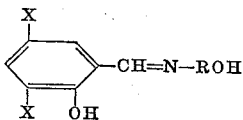

and the copper, zinc, iron, manganese and nickel chelates thereof, in which X is a halogen and R is a lower alkylene or a hydroxy lower alkylene group having from 2 to 10 carbon atoms.

---

This invention relates to a group of chemical compounds and compositions formulated thereof having fungicidal properties and it relates also to the use of such compounds and compositions in applications as a fungicide.

It is an object of this invention to produce and to provide a method for producing compounds and compositions having improved fungicidal properties and it is a related object to provide a method and process for preparation and use of same which is effective in the treatment of plants, which has application for the protection for a wide variety of plants against fungus attack, which is capable of simple and efficient manufacture and use for the protection of plants and from which the desired protection can be achieved at minimum cost or expense.

The concepts of this invention reside in the chemical compounds and their corresponding chelates in which the chemical compound is represented by the following general formula

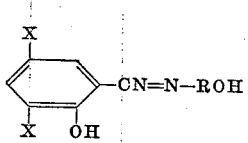

in which X is a halogen, preferably chlorine or bromine, and R is a divalent organic radical having from 2 to 10 carbon atoms, and in which the chelates are of a metal such as copper, zinc, iron, manganese or nickel.

The compounds of this invention are prepared by a reaction of the halogen with salicylic aldehyde to yield a compound which is halogenated in the 3-5 position with respect to the —CHO group, as represented by the following:

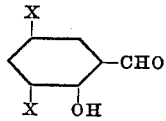

The halogenated derivative is then reacted with an amino alcohol $H_2N$—R—OH to split off water and yield the corresponding imino alcohol having a "Schiff's base," as represented by the following:

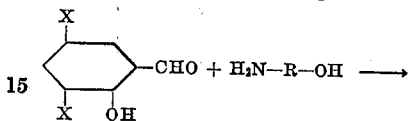

The corresponding chelate is obtained by reaction of the "Schiff's bases" with a salt of the corresponding metal, such as copper, zinc, iron, manganese or nickel.

In the following tables, illustration is made by way of structural formulae of chemical compounds coming within the scope of this invention, and hereinafter identified as "Schiff's bases" and chelates, along with the yield obtained in preparation by the process heretofore described and the melting points of the corresponding compounds.

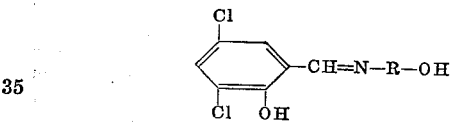

TABLE I.—CONDENSATION PRODUCTS

| R | Yield, percent | Melting point, deg. | Copper chelate Melting point, deg. | Copper chelate Yield, percent |
|---|---|---|---|---|
| —CH$_2$—CH$_2$— | 79 | 134 | | |
| —CH$_2$—CH$_2$—CH$_2$— | 79 | 100 | 200 | 74 |
| —CH—CH$_2$—<br>\|<br>CH$_2$<br>\|<br>CH$_3$ | 88 | 242 | 129 | 73 |
| —CH$_2$—CH—<br>\|<br>CH$_3$ | 85 | 82 | 222 | 98 |
| CH$_2$OH<br>\|<br>—C—CH$_2$—<br>\|<br>CH$_2$OH | 57 | 224 | | |
| CH$_3$<br>\|<br>—C—CH$_2$—<br>\|<br>CH$_3$ | 87 | 143 | >300 | 55 |
| CH$_2$OH<br>\|<br>—C—CH$_2$—<br>\|<br>C$_2$H$_5$ | 85 | 187 | | |

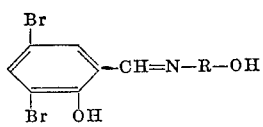

TABLE II.—CONDENSATION PRODUCTS

| R | Yield, percent | Melting point, deg. | Copper chelate Melting point, deg. | Copper chelate Yield, percent |
|---|---|---|---|---|
| —CH$_2$—CH$_2$— | 68 | 148 | | |
| —CH$_2$—CH$_2$—CH$_2$— | 63 | 89 | 204 | 69 |
| —CH—CH$_2$—<br>  \|<br>  CH$_2$<br>  \|<br>  CH$_3$ | 79 | 147 | 142 | 73 |
| —CH$_2$—CH—<br>      \|<br>      CH$_3$ | 68 | 82 | 212 | 92 |
| CH$_2$OH<br>  \|<br>—C—CH$_2$—<br>  \|<br>  CH$_2$OH | 89 | 240 | | |
| CH$_3$<br>  \|<br>—C—CH$_2$—<br>  \|<br>  CH$_3$ | 74 | 178 | 261 | 55 |
| CH$_2$OH<br>  \|<br>—C—CH$_2$—<br>  \|<br>  C$_2$H$_5$ | 66 | 174 | | |

The compounds are secured as well defined crystals. The formed Schiff's bases are yellowish in color, ranging from a bright yellow to an orange yellow, while the copper chelates are greenish in color, ranging from pale green to spinach green.

The dichlorinated salicylaldehyde, which consititutes an intermediate in preparation of the compounds embodied in the practice of this invention, exhibits some degree of fungicidal activity and its condensation products with aniline or chlorinated aniline also have fungicidal properties, as determined by the studies of Smith et al. (Ann. App. Biol. 1961, 49, pp. 102–109, 233–245) entitled, "Investigations on Fungitoxic Derivatives of Salicylaldehyde." However, the fungicidal effects of compositions embodying the practice of this invention are markedly superior in their fungicidal properties by comparison with the dichlorinated salicylaldehyde or its condensation product with aniline (Smith et al.).

For purposes of comparison, the fungicidal power of compositions embodying the practice of this invention has been tested on various parasitic fungi of vegetables. The products have been evaluated systematically by experiments on the oidium of wheat, the alternaria of the tomato, the septoria of celery and on certain wood fungi. It will be understood that application of the products as fungicides is not limited only to the fungi which have served in these tests. Instead, the fungicidal effect has been found also to be available generally on all parasitic fungi, mildew, wood fungi, and the like.

The tests have been carried out in the form of a preventive treatment. First, the plants were treated with a spraying mixture prepared with a wettable powder in an amount to dilute the active fungicidal agent to an amount of 2 grams per liter. This concentration corresponds to the dosage usually employed for zinebe, which is a conventional organic fungicide. The plant is then seeded with spores of the fungus to be studied.

In these tests, as set forth in the following tabulations, the numeral 4 indicates that the development of the fungus has been completely inhibited by the treatment; 3 indicates that the inhibition effect is intense but not complete; 2 indicates that the effect is average; 1 indicates that the effect is visible but not very pronounced, and 0 indicates that the effect is negligible.

The following examples of the fungicidal effects of compositions embodying the concepts of this invention are given by way of illustration, but not by way of limitation:

*Examples 1 to 5*

In these examples, the plants treated include oidium of wheat, alternaria of tomato and septoria of celery. The active ingredients present in an amount corresponding to 2 grams in a liter of wettable powder include (1) dichlorinated salicylaldehyde, (2) the salicylidene-aniline of Smith et al. as representative of the most similar compositions of the prior art, and the following compounds:

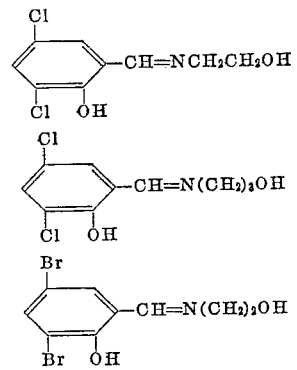

The latter of the foregoing compounds is prepared by the condensation reaction of amino ethanol with 3-5-dibromo salicylaldehyde. This latter compound has also been separately tested against wood fungi, such as *Coniophora cerebella*, *Chaetomium globosum* and *Coriolus versicolor*, with results that are at least equivalent to that secured with pentachlorophenol which normally has been used for this specie of fungi.

TABLE III

| Active compound | Oidium of wheat (*Erysiphe graminis*) | Alternaria of tomato (*Alternaria solani*) | Septoria of celery (*Septoria apii*) |
|---|---|---|---|
| Cl–C$_6$H$_2$(Cl)(OH)–CHO<br>Dichlorinated salicylaldehyde | 1 | 0 | 0 |
| Cl–C$_6$H$_2$(Cl)(OH)–CH=N–C$_6$H$_5$<br>Smith salicylidene aniline | 2 | 3 | 3 |
| Cl–C$_6$H$_2$(Cl)(OH)–CH=NCH$_2$CH$_2$OH | 3 | 4 | 3 |
| Cl–C$_6$H$_2$(Cl)(OH)–CH=N(CH$_2$)$_3$OH | 4 | 4 | 4 |
| Br–C$_6$H$_2$(Br)(OH)–CH=N(CH$_2$)$_2$OH | 3 | 4 | 3 |

Example 6

The compound

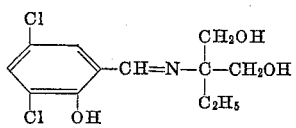

is formulated with a wettable powder in an amount corresponding to 2 grams per liter. Complete inhibition of the growth of *"Uromyces appendiculatus,"* responsible for the rust of wheat, and of *"Plasmopora viticola,"* responsible for mildew of the vine, is secured.

Example 7

The compound

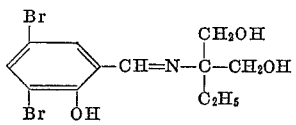

employed in an amount within the range of 0.5 to 5 grams per liter diluted with a wettable powder or in an aqueous dispersion gives complete inhibition of the growth of *"Uromyces appendiculatus,"* of *"Plasmopora viticola,"* or *"Septoria apii"* and of *"Erysiphe graminis."*

The compounds employed in the practice of this invention are inexpensive compounds which can be prepared of readily available materials. They are simple to manufacture and of great industrial interest for use in combatting parasitic fungi. It will be apparent from the foregoing examples that they are particularly active and that their polyvalence is of considerable interest. For agricultural uses, use can be made of the chemical compounds in admixture with wettable powders such as those which are described hereinafter, or in aqueous emulsions in which the compound is present in an amount within the range of 0.5 to 5 grams of active material per liter.

Active products are primarily used as emulsions, obtained from dispersion of wettable powders. Such powders are prepared in mixing from 5 to 90% of active products with a carrier such as kaolin, a wetting agent such as dodecylbenzene sulfonate and a dispersing agent such as cellulose bisulphite or lignosulfonate. The mixture very finely ground can be used in powdery state or dispersed in water.

The active product may be also solved in a solvent, for example xylene; the solution can be dispersed in water with an addition of emulsifying and dispersing agents.

It will be understood that various changes and modifications may be made in the above described process which provide the characteristics of this invention without departing from the spirit thereof particularly as defined in the following claims.

We claim:
1. In the treatment of fungus, the steps of applying to said fungus a composition containing as an essential ingredient a fungicidal effective amount of an agent selected from the group consisting of a compound having the following structural formula and copper, zinc, iron, manganese and nickel chelates thereof:

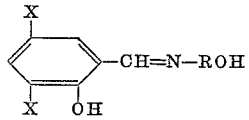

in which X is a halogen and R is a lower alkylene or hydroxy lower alkylene having from 2 to 10 carbon atoms.

2. The method as claimed in claim 1 in which X is chlorine.

3. The method as claimed in claim 1 in which X is bromine.

4. The method as claimed in claim 1 in which the composition comprises a wettable powder in which the essential ingredient is admixed in an inert finely divided pulverulent carrier, a wetting agent and a dispersing agent and in which the essential ingredient is present in an amount within the range of 0.5 to 5 grams per liter.

5. A fungicidal composition containing as the essential ingredient an agent selected from the group consisting of a compound having the following structural formula and a copper, zinc, iron, manganese and nickel chelate thereof:

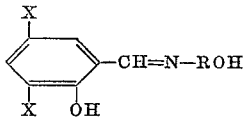

in which X is a halogen and R is a lower alkylene or hydroxy lower alkylene having from 2 to 10 carbon atoms.

6. A composition as claimed in claim 5 in which X is chlorine.

7. A composition as claimed in claim 5 in which X is bromide.

8. A composition as claimed in claim 5 in which the composition comprises a wettable powder in which the essential ingredient is admixed in an inert finely divided pulverulent carrier, a wetting agent and a dispersing agent and in which the essential ingredient is present in an amount within the range of 0.5 to 5 grams per liter.

References Cited

UNITED STATES PATENTS

| | | | |
|---|---|---|---|
| 2,668,115 | 2/1954 | Wolf | 260—566 X |
| 2,712,031 | 6/1955 | Huffman | 260—566 X |

LEWIS GOTTS, *Primary Examiner.*

S. K. ROSE, *Assistant Examiner.*